US012569756B2

(12) United States Patent
Xu

(10) Patent No.: US 12,569,756 B2
(45) Date of Patent: Mar. 10, 2026

(54) CLOUD APPLICATION-BASED DEVICE CONTROL METHOD AND APPARATUS, ELECTRONIC DEVICE AND READABLE MEDIUM

(71) Applicant: Tencent Technology (Shenzhen) Company Limited, Shenzhen (CN)

(72) Inventor: Shili Xu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 225 days.

(21) Appl. No.: 18/239,665

(22) Filed: Aug. 29, 2023

(65) Prior Publication Data
US 2023/0398443 A1 Dec. 14, 2023

Related U.S. Application Data

(63) Continuation of application No. PCT/CN2022/106151, filed on Jul. 18, 2022.

(30) Foreign Application Priority Data

Jul. 21, 2021 (CN) .......................... 202110827404.8

(51) Int. Cl.
*A63F 13/358* (2014.01)
*A63F 13/355* (2014.01)
(52) U.S. Cl.
CPC .......... *A63F 13/358* (2014.09); *A63F 13/355* (2014.09)

(58) Field of Classification Search
CPC ........ A63F 13/28; A63F 13/285; A63F 13/31; A63F 13/32; A63F 13/323; A63F 13/33;
(Continued)

(56) References Cited

U.S. PATENT DOCUMENTS 11,418,560 B1 * 8/2022 Hinds .................. H04L 65/612
2006/0046843 A1 3/2006 Nakajima
(Continued)

FOREIGN PATENT DOCUMENTS

CN 107427722 A 12/2017
CN 111729293 A 10/2020
(Continued)

OTHER PUBLICATIONS

Tencent Technology, ISR, PCT/CN2022/106151, Oct. 11, 2022, 2 pgs.
(Continued)

*Primary Examiner* — Lawrence S Galka
(74) *Attorney, Agent, or Firm* — Morgan, Lewis & Bockius LLP

(57) ABSTRACT

This application provides a cloud application-based device control method performed by an electronic device. The method includes: establishing a communication connection with a cloud application server; receiving a video stream corresponding to a cloud application scene transmitted by the cloud application server and multimedia feedback information corresponding to the cloud application scene; and controlling a physical device associated with the cloud application client to execute a multimedia feedback operation in accordance with the multimedia feedback information while the video stream corresponding to the cloud application scene being played.

14 Claims, 5 Drawing Sheets

Laptop
103

Pocket PC
104

Tablet computer
105

Desktop computer
102

Cloud application server
101

Phone
106

(58) Field of Classification Search

CPC .... A63F 13/332; A63F 13/352; A63F 13/355; A63F 13/358; A63F 13/48; A63F 13/77; A63F 2300/1037; A63F 2300/538; A63F 2300/552; A63F 2300/636; G06F 3/01; G06F 3/011; G06F 3/016; G06T 19/006; G06V 20/20; H04L 65/1069; H04L 65/80; H04L 67/131

See application file for complete search history.

(56) References Cited

U.S. PATENT DOCUMENTS

| | | | |
|---|---|---|---|
| 2016/0082356 | A1 | 3/2016 | Ukida |
| 2017/0036108 | A1 | 2/2017 | Sakata |
| 2023/0405454 | A1* | 12/2023 | Phillips ................. A63F 13/352 |

FOREIGN PATENT DOCUMENTS

| | | |
|---|---|---|
| CN | 111957039 A | 11/2020 |
| CN | 112090060 A | 12/2020 |
| CN | 112354176 A | 2/2021 |
| CN | 112755530 A | 5/2021 |
| JP | 2006068210 A | 3/2006 |
| JP | 2015525105 A | 9/2015 |
| JP | 2020501619 A | 1/2020 |
| WO | WO 2014004650 A1 | 1/2014 |
| WO | WO 2015162942 A1 | 10/2015 |
| WO | WO 2017218136 A1 | 12/2017 |

OTHER PUBLICATIONS

Tencent Technology, Korean Office Action, KR Patent Application No. 10-2023-7033698, Apr. 25, 2025, 11 pgs.

Tencent Technology, WO, PCT/CN2022/106151, Oct. 11, 2022, 4 pgs.

Tencent Technology, IPRP, PCT/CN2022/106151, Jan. 18, 2024, 5 pgs.

* cited by examiner

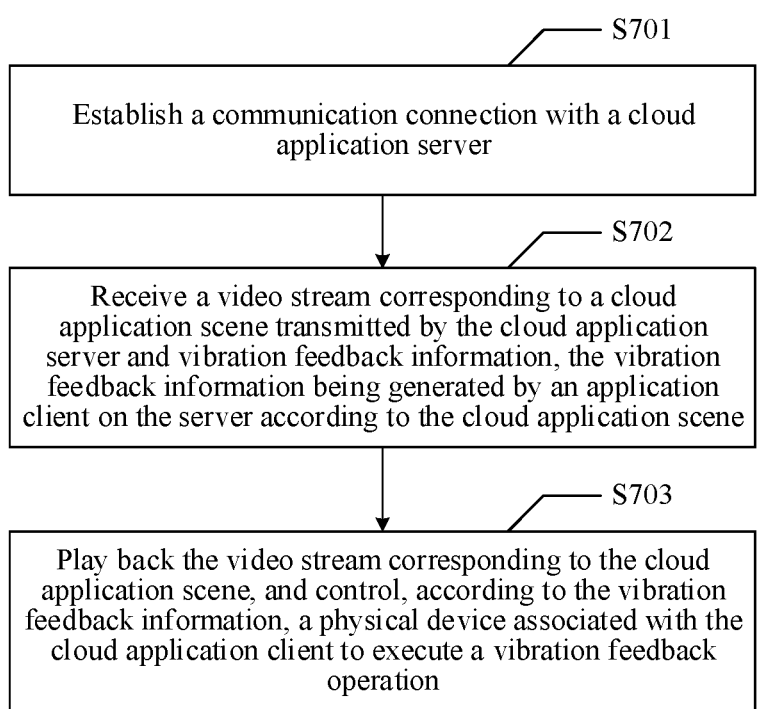

S701

Establish a communication connection with a cloud application server

S702

Receive a video stream corresponding to a cloud application scene transmitted by the cloud application server and vibration feedback information, the vibration feedback information being generated by an application client on the server according to the cloud application scene

S703

Play back the video stream corresponding to the cloud application scene, and control, according to the vibration feedback information, a physical device associated with the cloud application client to execute a vibration feedback operation

FIG. 7

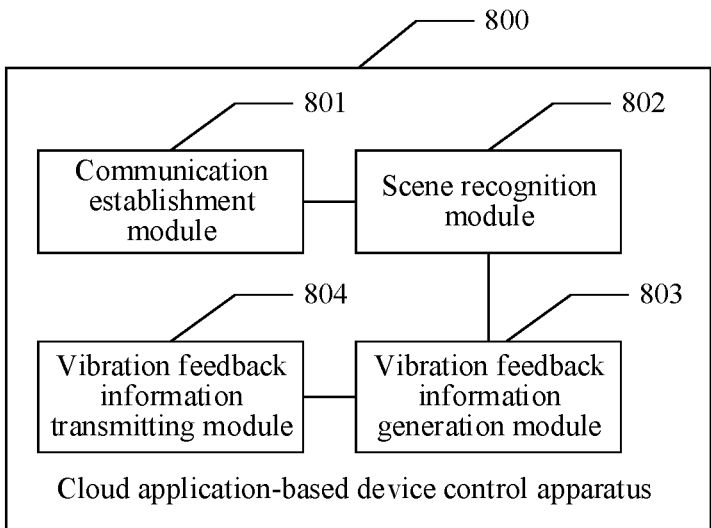

800

801
Communication establishment module

802
Scene recognition module

804
Vibration feedback information transmitting module

803
Vibration feedback information generation module

Cloud application-based device control apparatus

FIG. 8A

CLOUD APPLICATION-BASED DEVICE CONTROL METHOD AND APPARATUS, ELECTRONIC DEVICE AND READABLE MEDIUM

CROSS-REFERENCE TO RELATED APPLICATIONS

This application is a continuation application of PCT Patent Application No. PCT/CN2022/106151, entitled "DATA PROCESSING METHOD AND APPARATUS, COMPUTER AND READABLE STORAGE MEDIUM" filed on Jul. 18, 2022, which claims priority to Chinese Patent Application No. 202110827404.8, filed with the Chinese Patent Office on Jul. 21, 2021 and entitled "CLOUD GAME-BASED CONTROL METHOD AND APPARATUS, ELECTRONIC DEVICE AND READABLE MEDIUM".

FIELD OF THE TECHNOLOGY

This application relates to the field of computer technologies, and in particular, to a cloud application-based device control method and apparatus, an electronic device, and a readable medium.

BACKGROUND OF THE DISCLOSURE

With the rapid development of Internet technology, people have increasingly high requirements for entertainment forms. Games are one of the important forms of entertainment, especially for the current popular cloud games, which do not require users to have highly configured hardware to provide users with excellent entertainment experience.

For this type of cloud application, because the running process of the cloud application occurs on a server, an application client on the server needs to render the picture and scene of the application into a video and transmit it to a user terminal, and play it on the user terminal to display interface content.

However, due to the fact that the cloud application runs on the server, only rendered audio and video stream may be received on a terminal device, which may provide limited interaction manners, making it difficult to provide a rich and immersive experience, and affecting the interaction effect between the cloud applications and the users.

SUMMARY

Based on the technical problems, this application provides a cloud application-based device control method and apparatus, an electronic device, and a readable medium to enable a server to trigger multimedia feedback (e.g., vibration) consistent with the application content in a cloud application scene, thereby improving the accuracy of multimedia feedback, and thus improving the user experience.

Other features and advantages of this application will become obvious through the following detailed descriptions or partially learned through the practice of this application.

According to one aspect of embodiments of this application, provided is a cloud application-based device control method, executed by an electronic device, including:

establishing a communication connection with a cloud application server;

receiving a video stream corresponding to a cloud application scene transmitted by the cloud application server and multimedia feedback information corresponding to the cloud application scene; and controlling a physical device associated with the cloud application client to execute a multimedia feedback operation in accordance with the multimedia feedback information while the video stream corresponding to the cloud application scene being played.

According to one aspect of the embodiments of this application, provided is an electronic device, including: a processor; and a memory, configured to store an executable instruction of the processor; the processor being configured to execute the executable instruction and causing the electronic device to implement the cloud application-based device control method in the technical solution above.

According to one aspect of the embodiments of this application, provided is a non-transitory computer-readable storage medium, having a computer program stored thereon, the computer program, when executed by a processor of an electronic device, causing the electronic device to implement the cloud application-based device control method in the technical solution above.

It is to be understood that, the foregoing general descriptions and the following detailed descriptions are merely exemplary and explanatory, and are not intended to limit this application.

BRIEF DESCRIPTION OF THE DRAWINGS

The accompanying drawings here, which are incorporated herein and constitute a part of the specification, illustrate embodiments consistent with this application and, together with the specification, serve to explain the principles of the embodiments of this application. Apparently, the accompanying drawings in the following description are merely some embodiments of this application, and a person of ordinary skill in the art may obtain other accompanying drawings according to the accompanying drawings without creative efforts. In the accompanying drawings:

FIG. 7 is a flowchart of a cloud application-based device control method according to another embodiment of this application.

FIG. 8A exemplarily illustrates a block diagram of a cloud application-based device control apparatus according to an embodiment of this application.

DESCRIPTION OF EMBODIMENTS

Exemplary implementations will now be described more thoroughly with reference to the accompanying drawings. However, exemplary implementations may be implemented in multiple forms, and it is not to be understood as being limited to the examples described herein. Conversely, providing these implementations enables this application to be more comprehensive and complete and the conception of the exemplary implementations are comprehensively delivered to a person skilled in the art.

In addition, the described features, structures or characteristics may be combined in one or more embodiments in any appropriate manner. In the following descriptions, numerous specific details are provided to give a thorough understanding of the embodiments of this application. However, a person skilled in the art may appreciate that, the technical solutions in this application may be implemented without one or more of the particular details, or other methods, components, apparatuses, steps, etc. may be used. In other cases, well-known methods, apparatuses, implementations, or operations are not shown or described in detail, to avoid obscuring the aspects of this application.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely exemplary descriptions, do not need to include all contents and operations/steps, and do not need to be executed in an order described either. For example, some operations/steps may be also divided, while some operations/steps may be combined or partially combined. Therefore, an actual order of execution may change according to an actual situation.

Each embodiment of this application is applied to an application scene of a cloud application. The so-called "cloud application" refers to the embodiment of a cloud computing technology in an application layer. A working principle of the "cloud application" is to transform the use of traditional application programs (or software) "locally installed and locally calculated" into an "out of the box" service, connecting and manipulating a remote server cluster through the Internet or local area network to complete service logic or computing tasks.

A main carrier of the "cloud application" is Internet technology. The cloud application client is presented in the form of a thin client or a smart client, and an interface thereof is an integration of HTML5, JavaScript, or Flash and other technologies. The cloud application may not only help users reduce IT costs, but also greatly improve work efficiency.

Figure 1:
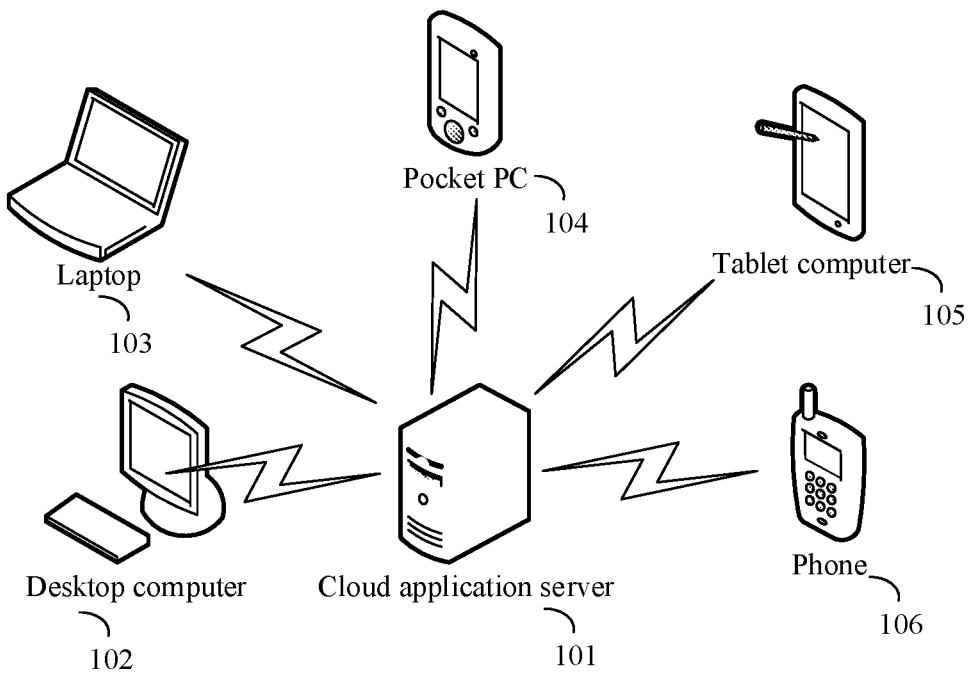
FIG. 1 is a schematic network architecture diagram of a cloud application-based device control system according to an embodiment of this application.

Specifically, the cloud application-based device control system may run in a network architecture as shown in FIG. 1. As shown in FIG. 1, the cloud application-based device control system includes a cloud server 101 and various types of terminal devices 102-106. The cloud server 101 may provide a control process of cloud applications for various types of terminal devices 102-106, that is, an operation instruction is transmitted to the cloud server 101 according to the user's control operation on the terminal devices 102-106. The cloud server 101 performs cloud application instance control, scene recognition, operation result calculation and audio/video rendering and other processing for the operation instruction, and returns information corresponding to the operation instruction to the terminal devices 102-106, such as a picture, music, etc.

It is to be understood that, FIG. 1 shows a variety of terminal devices 102-106, which may be computer devices. In an actual scene, more or fewer types of terminal devices may participate in the process of controlling cloud applications, the specific number and type depend on the actual scene, which is not limited here.

In addition, FIG. 1 shows a cloud server 101, but in the actual scene, multiple cloud servers may also participate, especially in a scene where multiple different cloud game instances are running, and the specific number of cloud servers depends on the actual scene.

The cloud server may be an independent physical server, and may also be a server cluster or a distributed system composed of multiple physical servers, and may also be a cloud server that provides basic cloud computing services such as a cloud service, a cloud database, cloud computing, a cloud function, cloud storage, a network service, cloud communication, a middleware service, a domain name service, a security service, CDN, big data and an artificial intelligence platform. The terminal may be, but is not limited to a smart phone, a tablet computer, a notebook computer, a desktop computer, a smart speaker, a smart watch, or the like. The terminal and the cloud server may be directly or indirectly connected via wired or wireless communications, and the terminal and the cloud server may be connected to form a blockchain network, which is not limited in this application.

Among various specific cloud applications, cloud gaming is an online gaming technology based on a cloud computing technology, also known as gaming on demand. The cloud gaming technology enables lightweight devices with relatively limited graphics processing and data computing capabilities, such as thin clients, to run a high-quality game.

It is to be understood that the technical solutions of this application may be applied to the cloud game scene, such as a cloud game platform, including a cloud server and a game terminal device. The cloud server includes a device system or program with a cloud game control function, and the game terminal is configured to control various operations of the user during the user's game.

In the cloud game scene, a game does not run on a player's game terminal device, but rather on a cloud server that renders the game scene as an audio and video stream and transmits it to the player's game terminal device through a network. The game terminal device of the player does not need to have strong graphics computing and data processing capabilities, but only needs to have basic streaming media playback capabilities, as well as the ability to obtain a player input instruction and transmit it to the cloud server.

According to the embodiments of this application, when the cloud application is a cloud game, the cloud game-based device control method may be run on a personal mobile terminal, and may also be run on a cloud server, or a third-party device to provide control of the cloud game. The device control system for a specific cloud game may be run on the foregoing device in the form of a program, may also be run as a system component in the foregoing device, and may also be used as one of cloud service programs, the specific operation mode depends on the actual scene, which is not limited here.

Figure 2:
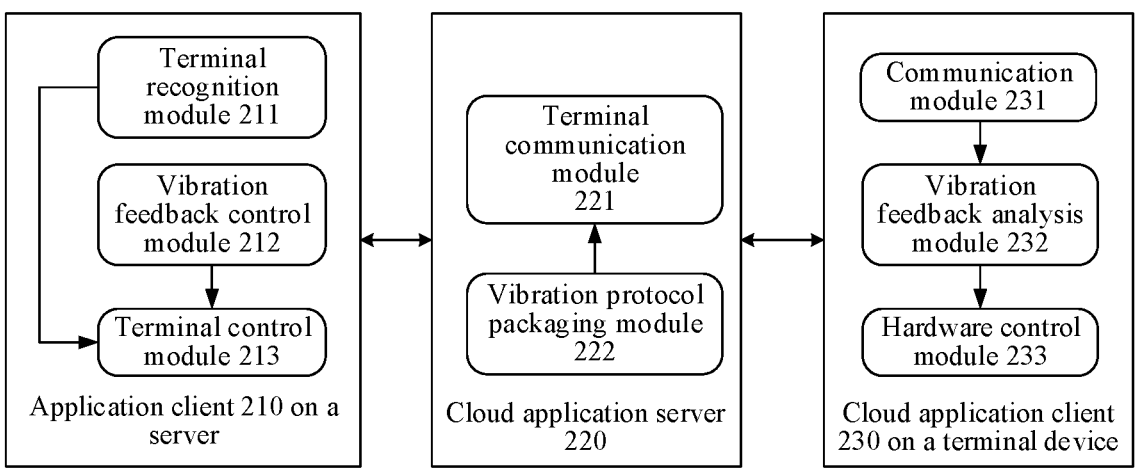
FIG. 2 is a schematic diagram of a cloud application device control frame according to an embodiment of this application.

This application proposes a cloud application-based device control method that may be applied to a cloud application device control frame as shown in FIG. 2. FIG. 2 is a schematic diagram of a cloud application device control frame according to an embodiment of this application, including an application client 210 on a server, a cloud application server 220, and a cloud application client 230 on a terminal device.

The application client 210 transmits an instruction to the cloud application server 220 through a terminal recognition module 211, and the instruction ultimately reaches a cloud application client 230 to query whether a terminal device (such as an intelligent terminal) where the cloud application client 230 is currently located or a physical device associated with the cloud application client 230 supports multimedia feedback, e.g., vibration, sound, light, etc., as well as the format and content of the supported multimedia feedback. For illustrative purposes, the rest of the description uses the vibration feedback as an example. But the technical solutions can be applied to the other types of multimedia feedback information with little, if any, changes.

A terminal control module 213 establishes a communication with the cloud application client 230 based on information provided by the terminal recognition module 211, the communication is transferred through the cloud application server 220 to transmit vibration feedback information through the established communication.

A vibration feedback control module 212 of the application client 210 triggers corresponding vibration feedback according to different application scenes, obtains an actual file of the vibration feedback information, and transmits the file to the cloud application server 220 through the terminal control module 213, the file is transferred by the cloud application server 220 and finally is transmitted to the cloud application client 230.

The cloud application server 220 establishes a link with the cloud application client 230 through a terminal communication module 221, obtains support information for vibration feedback from the cloud application client 230, and transmits a control protocol for vibration feedback to the cloud application client 230. A vibration protocol packaging module 222 is configured to receive the vibration feedback information transmitted by the application client 210, and package the vibration feedback information according to the defined protocol, and transmit it to the cloud application client 230 through the terminal communication module 221.

The cloud application client 230 establishes a communication connection with the cloud application server 220 through a communication module 231 based on a request of the cloud application server 220, and receives information such as a hardware query instruction and a vibration feedback instruction transmitted by the cloud application server 220. A vibration feedback analysis module 232 is configured to analyze the vibration feedback instruction received from the communication module 231 according to the defined protocol and call a hardware control module 233. The hardware control module 233 is configured to receive the instruction from the vibration feedback analysis module 232 and call a corresponding interface of the terminal device for actual hardware driving to implement vibration feedback.

Specifically, when the cloud application is a cloud game, the application client 210 refers to a game client, the cloud application server 220 refers to a cloud game server, and the cloud application client 230 refers to a cloud game client.

Figure 3:
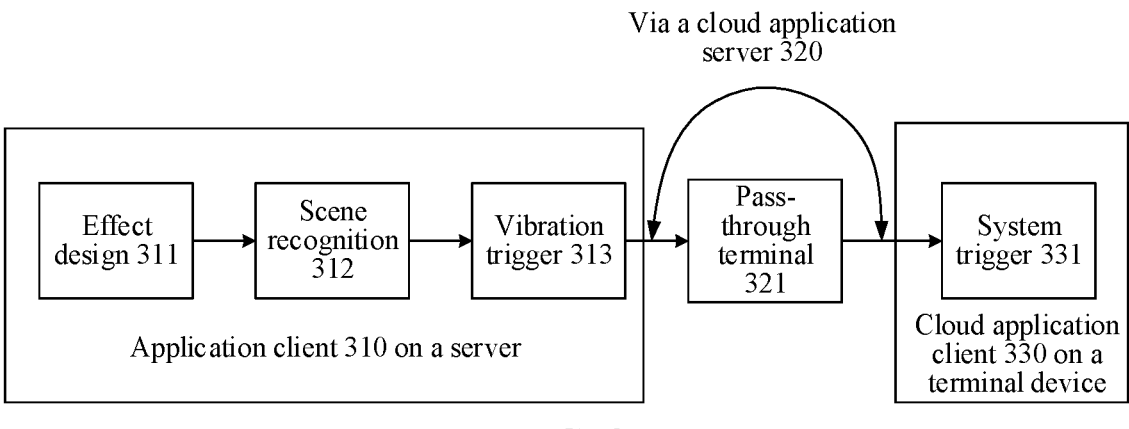
FIG. 3 is a schematic diagram of a vibration effect design process according to this application.

In order to trigger vibration feedback in combination with the application scene, special effect designs typically require displaying unique effects based on the application scene. Specifically, for ease of introduction, referring to FIG. 3, FIG. 3 is a schematic diagram of a vibration effect design process according to an embodiment of this application, including an interaction between an application client 310 on a server, a cloud application server 320, and a cloud application client 330 on a terminal device.

Effect design 311 refers to the server or the application client 310 on the server designing a specific vibration feedback effect for a specific scene.

Scene recognition 312 refers to the server or application client 310 recognizing a corresponding scene in the process of running an application (such as a game) and matching a relevant special effect description file. For example, in shooting games, the user may trigger different vibration feedbacks using different firearms. A virtual character of the user is hit, and vibration of different intensities is triggered according to the amount of blood loss, allowing the user to directly perceive the amount of blood loss through vibration. When the user encounters an enemy, a high-frequency and short vibration is triggered, prompting the user that a danger is approaching.

Vibration trigger 313 refers to the application client 310 on a server transmitting a vibration request to call a vibration trigger interface of a physical device. However, because the cloud application is rendered on the cloud application server 320, this request may not be directly delivered to the physical device, therefore, it needs to be transferred through the cloud application server 320.

A pass-through terminal 321 refers to the cloud application server 320 receiving a vibration request transmitted by the application client 310 and then passing through to the cloud application client 330 through communication connection.

System trigger 331 refers to after receiving the vibration request passed through by the cloud application server 320, the cloud application client 330 calls an interface of the physical device to trigger the vibration of hardware on the terminal device.

It is to be understood that the method provided by this application may be written as a program, as a processing logic in a hardware system, or as a control apparatus of the cloud application, and the foregoing processing logic is implemented using an integrated or external way.

Figure 4:
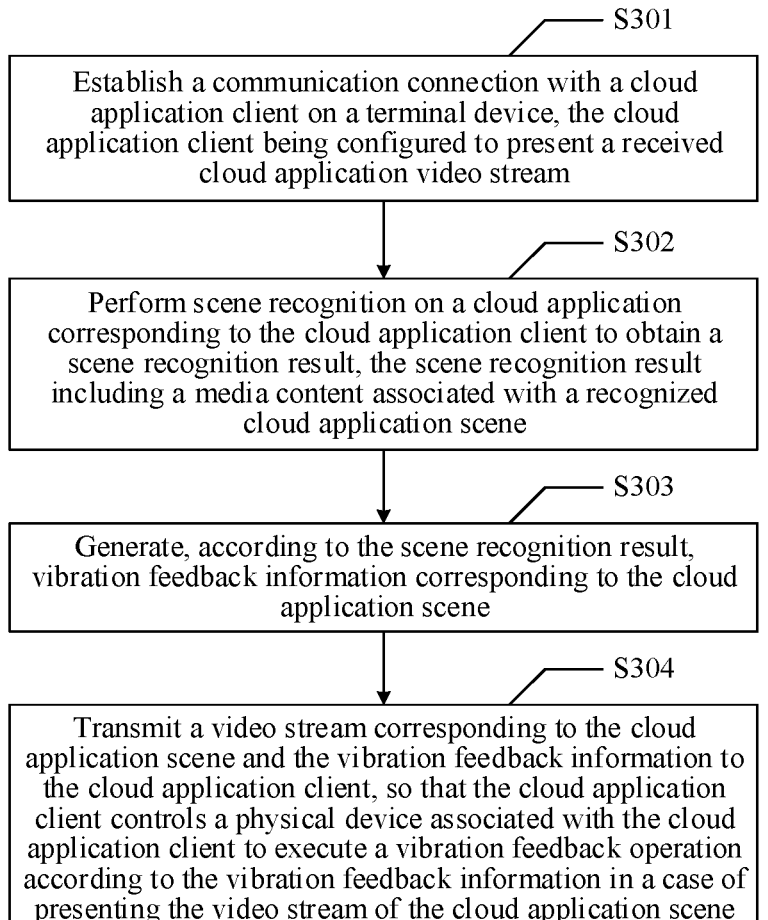
FIG. 4 is a flowchart of a cloud application-based device control method according to an embodiment of this application.

In combination with the foregoing process architecture, the cloud application-based device control method in this application will be introduced below. Referring to FIG. 4, FIG. 4 is a flowchart of a cloud application-based device control method according to an embodiment of this application, which is executed by an electronic device, for example, by the application client 210 on the server in FIG. 2, including the following steps:

Step S301: Establish a communication connection with a cloud application client on a terminal device, the cloud application client being configured to present a received cloud application video stream.

In this embodiment, the application client on the server establishes a communication connection with the cloud application client on the terminal device. The application client is a specific application program running on the server, while the cloud application client is an application used for presenting the received cloud application video stream on the terminal device.

Specifically, when the application client is a game client, the cloud application client is a cloud game client. For example, taking a racing game as an example, the cloud game client may specifically be a browser, a player, or a dedicated client on a mobile phone, mainly used for playing a game picture provided by the server, while the game client is an actual application program of the racing game running on the server.

The communication connection in this embodiment is mainly used for transmitting information related to vibration feedback, the communication connection may be a dedicated communication channel, or may also be used for video stream communication and control information communication between the application client and the cloud application client.

Step S302: Perform scene recognition on a cloud application corresponding to the cloud application client to obtain a scene recognition result, the scene recognition result including a multimedia content associated with a recognized cloud application scene.

In this embodiment, the cloud application is actually run by the application client on the server. The application client may recognize a scene where the cloud application is located according to the execution of the cloud application and user operations. For example, the game scene usually includes game progress, a game picture, game data, etc., and changes in data during the game may lead to changes in the game scene, such as changes in an environment where a virtual character is located in the game, changes in attributes such as health values, and the virtual character encounters various events or interacts with the environment.

The application client may recognize a specific cloud application scene according to the data content and data changes of the cloud application, thereby obtaining a scene recognition result. The scene recognition result includes a multimedia content associated with the recognized cloud application scene and used for indicating the performance of the virtual character in the cloud application over the next time period. For example, in a cloud game, when the virtual character falls from a high place, the scene recognition result may indicate that in the next time period, the virtual character falls on the ground and the damage it receives due to falling from a high place.

Step S303: Generate, according to the scene recognition result, vibration feedback information corresponding to the cloud application scene.

Specifically, the cloud application scene identified in the scene recognition result may determine the changes or events that occur in the cloud application in the next time period, thereby determining the vibration feedback that needs to be triggered in the cloud application scene, and generating vibration feedback information corresponding to the recognized cloud application scene. The vibration feedback information includes the types of vibration feedback performed and parameters for performing vibration feedback, such as execution time.

Depending on the type of vibration feedback supported by a physical device associated with the cloud application client, the vibration feedback information may include parameters corresponding to one or more vibration feedbacks.

Depending on the specific content of the cloud application scene, the vibration feedback information may include parameters required for multiple vibration feedbacks. For example, in a cloud game scene, when the target character collides with an obstacle three times during a fall, and vibration feedback is required for each collision, the vibration feedback information may include vibration feedback parameters of three sets of vibrations corresponding to the three collisions.

Step S304: Transmit a video stream corresponding to the cloud application scene and the vibration feedback information to the cloud application client, so that the cloud application client controls a physical device associated with the cloud application client to execute a vibration feedback operation according to the vibration feedback information when presenting the video stream of the cloud application scene.

Figure 5:
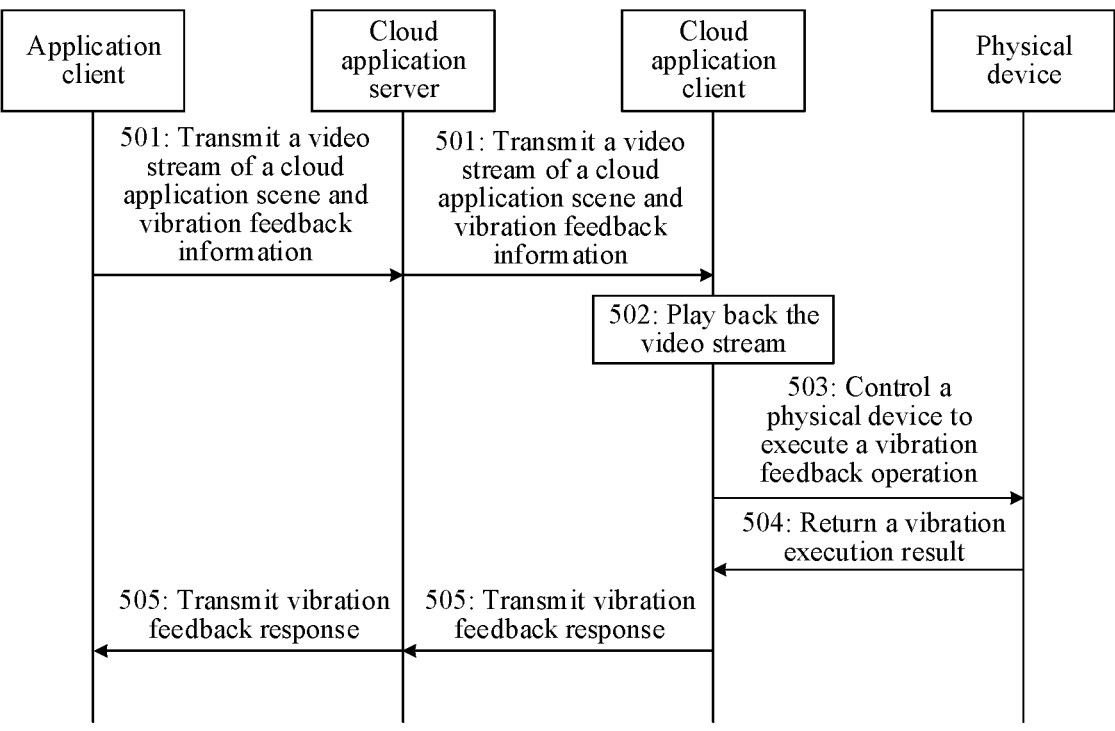
FIG. 5 is a process of triggering vibration feedback according to an embodiment of this application.

Specifically, for ease of introduction, referring to FIG. 5, FIG. 5 is a process of triggering vibration feedback according to an embodiment of this application, including the following steps:

Step 501: An application client transmits a video stream corresponding to the cloud application scene and the vibration feedback information to a cloud application client through a cloud application server.

The video stream of the cloud application scene is a video stream rendered based on an application picture that may be displayed in the cloud application scene.

Step 502: Play the video stream to a user after a cloud application client receives the video stream.

In this step, the cloud application client displays the video content to the user, such as the results of user operations.

Step 503: The cloud application client controls, according to the received vibration feedback information, an associated physical device to execute a vibration feedback operation when playing the video stream.

The physical device associated with the cloud application client may be a smart terminal where the cloud application client is located.

For example, the cloud application is a racing game, and the smart terminal where the cloud application client is located is a mobile phone. In the racing game, when a user manipulates a vehicle driven on the mobile phone to collide with an opponent, the video stream of the cloud game scene transmitted by the game client on the server may display a picture of the vehicle hitting the opponent, and when the video stream is played to the picture, the cloud game client may also control the mobile phone to vibrate for one second, thereby displaying the impact of the collision and improving the user's experience and immersion.

In view of the above, a more three-dimensional gaming experience may be achieved through the vibration feedback operation combined with the video stream of the presented cloud application scene.

Step 504: The physical device returns a vibration execution result to the cloud application client after completing the vibration feedback.

Step 505: The cloud application client generates a vibration feedback response message including the execution result of the vibration, and transmits the vibration feedback response message to the application client through a cloud application server.

In the embodiment of this application, scene recognition results are obtained through scene recognition, the vibration feedback information corresponding to the cloud application scene is generated, and the vibration feedback information is transmitted to the cloud application client through a communication connection with the cloud application client to control the associated physical device for vibration feedback operations. Through the foregoing way, the following benefits may be obtained:

(1) in the cloud application scene, a vibration driving signal is transmitted in real time by connecting a full link of the cloud application, with a delay consistent with the video stream of the cloud application, allowing the user to experience zero-delay vibration, improving the accuracy of vibration feedback, and improving the user experience.

(2) Based on the recognition of the scene, the corresponding vibration feedback information may be designed to more closely match the actual operation of the user, assist the user's operation and experience, make the user be more immersed in the application content (such as the game content) itself, and also maximize the hardware advantages of physical devices.

In one embodiment of this application, step S301 of establishing a communication connection with a cloud application client on the terminal device may include the following steps:

transmitting a communication establishment request to the cloud application client;

receiving a communication response message returned by the cloud application client; and establishing a communication connection with the cloud application client according to the communication response message.

The communication response message includes a vibration feedback type supported by the physical device and a protocol version of the vibration feedback.

The generating, according to the scene recognition result, vibration feedback information corresponding to the cloud application scene includes:

generating the vibration feedback information according to the scene recognition result, the vibration feedback type, and the protocol version of the vibration feedback.

Specifically, the application client on the server transmits a communication establishment request to the cloud application client. The communication establishment request may be transmitted based on an established audio/video communication link or control communication link between the application client and the cloud application client, and may be performed at any time before the cloud application is officially started. For example, when the cloud application client logs in to an account or other communication connections are established on the cloud application client, a communication connection for vibration feedback is established together.

Figure 6:
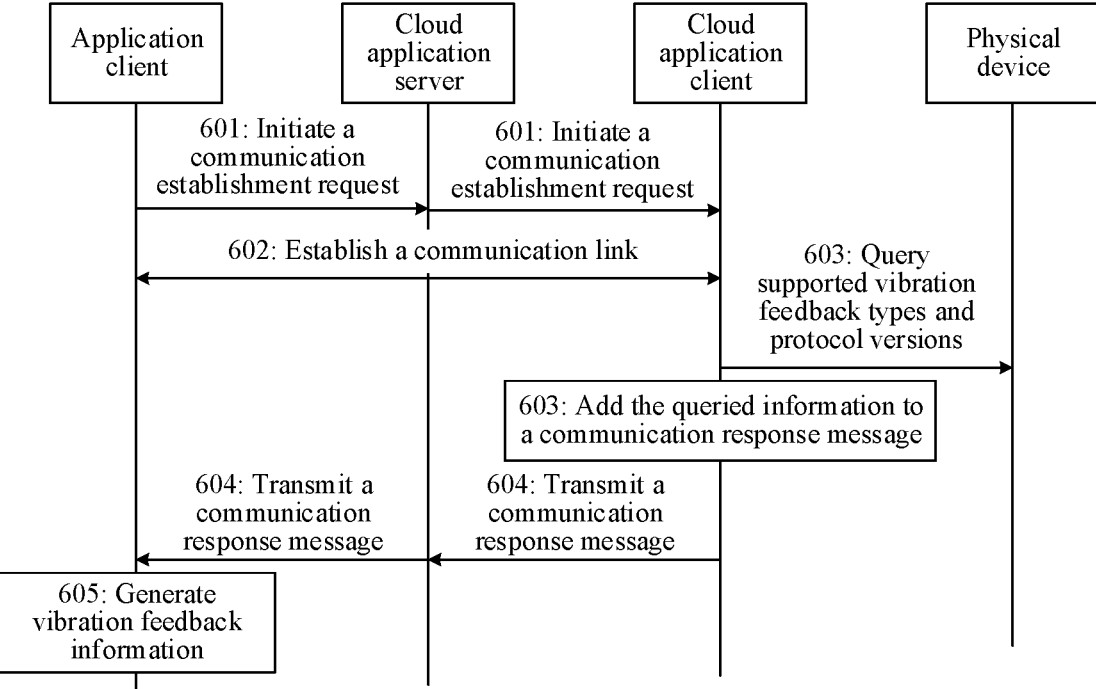
FIG. 6 is a process of establishing a communication connection with a cloud application client according to an embodiment of this application.

Specifically, for ease of introduction, referring to FIG. 6, FIG. 6 is a process of establishing a communication connection with a cloud application client according to an embodiment of this application, including the following steps:

Step 601: The application client transmits a communication establishment request to a cloud application client through a cloud application server according to a list of cloud application clients that have logged in to the server.

Step 602: Establish a communication connection with an application client according to the request when the cloud application client receives the communication establishment request.

Specifically, the connection may be established by a three-handshake process similar to an inquiry and a response of a network connection, or by saving the Internet protocol address of the server.

Step 603: The cloud application client queries a vibration feedback type supported by an associated physical device and a protocol version of the vibration feedback, and adds the queried information to a communication response message.

The vibration feedback type mainly refers to a function or module of the physical device that may be used for vibration feedback, while the protocol version of vibration feedback specifies the specific mode in which vibration feedback may be executed, for example, a vibration may include a long vibration, a short vibration, a long and short fusion vibration, and vibrations with different frequencies and intensities, and other types of vibration feedbacks are similar.

Step 604: The cloud application client transmits the communication response message to the application client through the cloud application server.

Step 605: The application client generates vibration feedback information according to the received vibration feedback type, the protocol version of the vibration feedback, and the recognized application scene.

In the embodiment of this application, a communication connection for transmitting vibration feedback information is established between the application client on the server and the cloud application client, so that the vibration feedback is transmitted from the server to the terminal device in time, providing a foundation for the server to control the terminal for vibration feedback, and improving the implementability of the solution.

In one embodiment of this application, step S302 of performing scene recognition on the cloud application corresponding to the cloud application client to obtain the scene recognition result may include the following steps:

acquiring a character attribute value of a target virtual character in the cloud application at a current moment; and recognizing the cloud application scene according to the character attribute value to obtain the scene recognition result.

Specifically, depending on the type of cloud application, the scene recognition result may be determined according to the events that occur in the target virtual character in the cloud application, or according to the time period in the cloud application.

The target virtual character is usually a character controlled by the user of the cloud application, or a non-user-controlled character that needs to be displayed. The character attribute value may include data related to application content such as the character's health value and physical strength value, or data related to application operation such as the spatial location of the character in the application and the stage it is in.

The scene of the cloud application may be recognized according to the character attribute value of the target virtual character at the current moment to obtain the scene recognition result. Specifically, a character attribute value being higher or lower than a certain value may be recognized as a specific scene, or the character attribute value changes to a certain amplitude, and may also be recognized as a scene that needs to trigger vibration.

For example, for a character health value, when the health value is lower than a set threshold, a lower health value scene may be recognized. In this scene, the terminal device may be controlled to vibrate or flicker at a certain frequency, so as to prompt the user and create a tense atmosphere.

Alternatively, step S302 of performing scene recognition on a cloud application corresponding to the cloud application client to obtain a scene recognition result may include the following steps:

acquiring, according to a mapping relationship between a preset time period and a scene identifier, a scene identifier of a target virtual character at a current moment, the scene identifier being configured to represent a surrounding environment where the target virtual character is located; and determining the scene recognition result according to a mapping relationship between a preset scene identifier and a scene type, and the scene identifier at the current moment.

The mapping relationship between the time period where the cloud application is located and the scene identifier is set in advance. The time period may refer to a progress of the cloud application, and the scene identifier is configured to represent the surrounding environment where the target virtual character is located.

Specifically, the scene of the cloud application may have an associated relationship with its progress (i.e., a length of time). For example, for games such as Parkour, the progress of the game progresses over time, and when reaching different time periods, it may reach different game scenes corresponding to different scene identifiers. Based on the time period, the scene identifier of the target virtual character at the current time may be determined.

Alternatively, the time period may be a time period recorded by a cloud application from a specific time point, such as a time period recorded when a virtual character enters a certain room in a game and starts timing.

The application client may determine the scene recognition result according to the mapping relationship between the preset scene identifier and the scene type. Specifically, the scene types are used for identifying specific classifications of different scenes, each scene type may correspond to multiple scene identifiers and require different vibration feedbacks.

For example, based on the mapping relationship between the time period and the scene identifier, the application client determines that a user's virtual character may fall into a trap when staying in a certain game scene for long time, and the scene identifier may identify the scene that falls into the trap. The scene type corresponding to the scene identifier is a fall type, and therefore, it may be further determined that the corresponding scene recognition result is being damaged based on the fall type.

In addition, a target scene type is used for identifying a scene that requires vibration feedback. Therefore, if the scene recognition result does not belong to the target scene type, the subsequent actions of the physical device for vibration feedback may not be controlled. For example, if the scene type is a relatively mild scene such as recovery or rest, vibration feedback may not be performed, and vibration feedback of the physical device may not be subsequently controlled.

In the embodiment of this application, specific methods for scene recognition are provided for targeted recognition of the application scene, which is conducive to improving the matching degree between the vibration feedback that needs to be performed subsequently and the current scene content.

In one embodiment of this application, the foregoing step of acquiring the character attribute value of the target virtual character in the cloud application at the current moment may include the following steps:

receiving a character control instruction transmitted by the cloud application client for the target virtual character; and controlling the target virtual character according to the character control instruction to obtain the character attribute value of the target virtual character at the current moment.

The foregoing step of recognizing the cloud application scene according to the character attribute value to obtain the scene recognition result may include the following steps:

determining an attribute value change amplitude according to a character attribute value of the target virtual character at a previous moment and a character attribute value at the current moment; and determining the scene recognition result according to the attribute value change amplitude.

In this embodiment, the scene recognition result may be determined according to the user's operation on the target virtual character. Specifically, taking a game client and a cloud game client as an example, the game client receives a character control instruction for the target virtual character transmitted by the cloud game client. The character control instruction may be an action control such as moving, attacking, or avoiding, or an interaction control with other physics in the scene.

The game client controls the target virtual character in the cloud game according to the character control instructions, and also obtains a result generated by the control to obtain a character attribute value of the target virtual character at the current moment. For example, moving the target virtual character may cause the character to be attacked, resulting in a decrease in health value, thereby obtaining a health value of the target virtual character at the current moment.

Then, the game client determines an attribute value change amplitude according to the character attribute value of the target virtual character at the previous moment and the character attribute value at the current moment. The previous moment refers to a moment before the game client controls the target virtual character. The attribute value change amplitude may be determined according to the comparison of character attribute values at two moments.

Furthermore, the scene recognition result is determined according to the attribute value change amplitude. For example, if the health value is significantly decreased, it may be determined that the scene recognition result is a significant amount of damage, in order to subsequently trigger the vibration of the physical device connected to the terminal to prompt the user.

In the embodiment of this application, the scene recognition result is determined by the changes in the attribute values of the target virtual character, thereby timely determining the scene recognition result in the cloud game process, improving the granularity of scene recognition, and determining the need for vibration feedback more accurately. In one embodiment of this application, based on the foregoing embodiments, the vibration feedback information includes a vibration feedback type, and the cloud application client controls the physical device to execute a vibration feedback operation indicated by the vibration feedback type.

Specifically, vibration feedback types supported by different physical devices may be different. For example, the intensity and type of a vibration effect that the mobile phone and other game peripherals support may be different. When generating vibration feedback information, the game client generates vibration feedback information according to the vibration feedback type supported by the recorded physical device and the vibration feedback required for the recognized scene.

After receiving the vibration feedback information, the cloud game client controls the physical device to execute a vibration feedback operation indicated by the vibration feedback type when vibration feedback is required. For example, when the game client determines that the current scene requires one long vibration and multiple short vibrations, vibration feedback information including both long vibration effect type and short vibration effect type is generated, and the cloud game client controls the mobile phone to perform long vibration and short vibration after receiving the vibration feedback information.

In the embodiment of this application, by defining the vibration feedback type in the vibration feedback information, different types of vibration feedbacks may be performed, improving the diversity of vibration feedback.

In one embodiment of this application, based on the foregoing embodiments, the vibration feedback information includes a time parameter of vibration feedback, the time parameter is used for indicating a time period for performing the vibration feedback, and the cloud application client controls the physical device to execute the vibration feedback operation within a time period indicated by the time parameter.

Specifically, the time parameters for vibration feedback may include a start moment and duration of the vibration, which may be determined according to the needs of different scenes. The start moment of the vibration is usually a relative moment, which is set relative to the start moment of the corresponding video stream to determine when to start performing the vibration feedback operation.

For example, when the start moment of the vibration effect is set to 10 ms, the cloud game client starts controlling the physical device to vibrate after playing the corresponding video stream for 10 ms. The duration of the vibration determines an end moment of the vibration feedback. In one embodiment, the vibration duration may not be included, and a predetermined uniform duration may be used instead.

It is to be understood that the duration of vibration does not mean that the vibration feedback action needs to be continued during the duration, for example, when the vibration feedback action may be an intermittent vibration, during the duration, the physical device may vibrate intermittently, and the total duration may reach a value specified by the duration.

In the embodiment of this application, the vibration feedback information includes a time parameter of the vibration feedback, so that the start moment and the end moment of the vibration feedback operation may be adjusted when playing a video stream, thereby triggering the vibration feedback operation more flexibly and improving the flexibility of the solution.

In one embodiment of this application, based on the foregoing embodiments, the vibration feedback information includes an execution frequency of vibration feedback, and the cloud application client controls the physical device to execute the vibration feedback operation according to the execution frequency of the vibration feedback.

Specifically, the execution frequency of vibration feedback specifies the frequency that an action involved in the vibration feedback needs to reach at the end of the vibration feedback operation. The execution frequency of vibration feedback may be determined according to the requirements of different scenes, for example, different vibration execution frequencies may be set according to different degrees of urgency.

For example, a vibration execution frequency represents a vibration frequency that needs to be reached at the end of the vibration feedback, and may be set to a relative value ranging from 0 to 100. In one embodiment, the vibration feedback executed at the previous moment may be continuous with the vibration feedback to be executed at the current moment, and if the execution frequency is different, the frequency may be adjusted so that it changes continuously without stopping and then restarting. For example, when the vibration frequency of the previous moment is 50, and the vibration frequency of the current moment is 70, the vibration frequency may be evenly adjusted from 50 to 70 according to a preset step.

For a first time period, or when vibration feedback of a same type is not performed at the previous moment, the frequency of the previous moment is 0 by default.

In the embodiment of this application, the vibration feedback information includes the execution frequency of vibration feedback, so that different frequencies of vibration feedbacks may be performed according to different scenes, thereby creating different atmospheres and enhancing the flexibility and expressiveness of the special effects.

In one embodiment of this application, based on the foregoing embodiments, the vibration feedback information includes an execution intensity of the vibration feedback, and the cloud application client controls the physical device to execute the vibration feedback operation according to the execution intensity of the vibration feedback.

Specifically, the execution intensity of the vibration feedback specifies a vibration intensity required by an action involved in the vibration feedback at the end of the vibration feedback operation. The execution intensity of the vibration feedback may be determined according to the requirements of different scenes, for example, different vibration execution intensities may be set according to different degrees of severity.

The execution intensity may be expressed as information such as an amplitude, and the value range may be set to a relative value from 0 to 100.

In one embodiment, the vibration feedback performed at the previous moment may be continuous with the vibration feedback to be performed at the current moment, and if the execution intensity is different, the intensity may be adjusted so that it changes continuously without stopping and then restarting.

For example, when the vibration intensity of the previous moment is 50, and the vibration intensity of the current moment is 70, the vibration intensity may be evenly adjusted from 50 to 70 according to the preset step.

For the first time period, or when vibration feedback of the same type is not performed on the previous moment, the intensity of the previous moment is 0 by default.

In the embodiment of this application, the vibration feedback information includes the execution intensity of the vibration feedback, so that vibration feedbacks of different intensities may be displayed according to different scenes, so as to be more consistent with the content of the game, thereby improving the diversity of vibration feedback.

In one embodiment of this application, based on the foregoing embodiments, step S304 of transmitting a video stream corresponding to the cloud application scene and the vibration feedback information to the cloud application client includes:

transmitting a video stream corresponding to the cloud application scene and the vibration feedback information to a cloud application server, so that the cloud application server packages the vibration feedback information according to a vibration protocol and transmits a packaging result and the video stream to the cloud application client.

In this embodiment, the application client may run on a separate server, while the cloud application server is another server. The server of the application client is in communication with the cloud application server through a wired or wireless network. The application client transmits the video stream corresponding to the rendered cloud application scene and the generated vibration feedback information to the cloud application server, while the cloud application server packages the vibration feedback information according to the vibration protocol, and transmits the packaging result and the video stream to the cloud application client.

Specifically, a definition of the vibration protocol for the vibration effect may be shown in Table 1 below:

TABLE 1

| | Field | Type | Description | Remark |
|---|---|---|---|---|
| | | | Vibration Effect Protocol | |
| 1 | Time | Int | A relative time at which the vibration starts, in the unit of ms. | |
| 2 | duration | Int | Duration | |
| 3 | freq | Int | Vibration frequency, a vibration frequency reached after the end of the duration, is a relative value ranging from 0 to 100. When the frequency is inconsistent with that of the previous period, it changes at a uniform speed, and when it is consistent, it maintains the same intensity of vibration. | When it is the first time period, the frequency of the previous period is 0 by default. |
| 4 | intensity | Int | Vibration intensity, a vibration intensity reached after the end of the duration, is a relative value ranging from 0 to 100. When the intensity is inconsistent with that of the previous period, it changes at a uniform speed, and when it is consistent, it maintains the same intensity of vibration. | When it is the first time period, the frequency of the previous period is 0 by default. |

According to the vibration feedback information transmitted by the application client, the cloud application server packages the vibration effects into a data packet composed of a start moment, a duration, a vibration frequency, and a vibration intensity according to the foregoing protocol, and then transmits the data packet together with the video stream to the cloud application client to control the vibration effects.

In the embodiment of this application, the application client transmits the video stream and vibration feedback information to the cloud application client through the cloud application server, so that multiple application clients may share a same cloud application server, thereby reducing the cloud application operation cost.

The cloud application-based device control method in this application is introduced below, the method is applied to a cloud application client. FIG. 7 shows a flowchart of a cloud application-based device control method according to another embodiment of this application, including the following steps:

Step S701: Establish a communication connection with a cloud application server.

Step S702: Receive a video stream corresponding to a cloud application scene transmitted by the cloud application server and vibration feedback information, the vibration feedback information being generated by an application client on the server according to the cloud application scene.

Step S703: Play back the video stream corresponding to the cloud application scene, and control, according to the vibration feedback information, a physical device associated with the cloud application client to execute a vibration feedback operation.

Specifically, the cloud application client establishes a communication connection with the cloud application server. The communication establishment process is usually initiated by the application client. The cloud application client starts a cloud application after logging in to the cloud application platform, and the cloud application platform starts a corresponding application client on the server, and the application client actively establishes a communication with the cloud application client. The cloud application client receives a communication establishment request from the application client and saves it locally for subsequent transmission of control information and various response messages.

The cloud application client receives a video stream corresponding to the cloud application scene and vibration feedback information from the cloud application server after establishing the communication. Taking a cloud game as an example, the progress of games in the cloud game is controlled by the cloud game client, a game client on the server executes the game content based on the user's operations, renders a game scene of the cloud game into a video stream, and generates vibration feedback information based on the content of the game scene. The cloud game client may play a video stream of the cloud game scene to the user, so as to display the game picture and operation results to the user for subsequent games, and may control a physical device associated with the cloud game client to execute the vibration feedback operation. For example, according to vibration information in the vibration feedback information, a mobile phone is controlled to vibrate.

In the embodiment of this application, the cloud application client establishes a communication connection with the cloud application server, and displays the application content according to the received video stream and the vibration feedback information and executes the vibration feedback operation, so that the application client on the server directly triggers the vibration of the physical device associated with the cloud application client in the cloud application scene, avoiding mismatches with the application content when vibrating based on an audio or video content, and improving the accuracy of vibration feedback.

In one embodiment of this application, based on the foregoing embodiments, the foregoing step of establishing a communication connection with the cloud application server may include the following steps:

receiving a communication establishment request transmitted by the cloud application server;

querying a vibration feedback type supported by the physical device and a protocol version of vibration feedback according to the communication establishment request; and transmitting a communication response message to the cloud application server, the communication response message including the vibration feedback type and the protocol version of the vibration feedback, so that the application client generates the vibration feedback information according to the vibration feedback type and the protocol version of the vibration feedback.

Specifically, taking a cloud game as an example, the cloud game client receives a communication establishment request transmitted by the cloud game server. The communication establishment request usually includes a communication parameter required for communication, and the cloud game client establishes a communication connection with the cloud game server based on the communication establishment request. The communication establishment request also includes a special effect query instruction, and the cloud game client may query the vibration feedback type supported by the physical device associated with the cloud game client and the protocol version of the vibration feedback based on the query instruction. The vibration feedback type is mainly used for identifying the types of vibration that physical devices may perform, such as vibration length and mode. The protocol version is mainly used for specifying parameters and communication formats needed to define vibration feedback operations.

The cloud game client transmits a communication response message to the cloud game server, and the communication response message includes the vibration feedback type and the protocol version of the vibration feedback. The communication response message is used for enabling the cloud game server to establish a communication connection with the cloud game client. Specifically, the communication response message may carry communication parameters of the cloud game client, such as the Internet address, so that the cloud game server establishes a corresponding communication connection.

In the embodiments of this application, a specific mode of establishing a communication between a cloud game client and a cloud game server is specifically introduced, which improves the implementability of the solution.

In one embodiment of this application, based on the foregoing embodiments, the physical device associated with the cloud application client also includes a third-party device. The controlling, according to the vibration feedback information, the physical device associated with the cloud application client to execute a vibration feedback operation includes:

generating a vibration control instruction for the third-party device according to the vibration feedback information; and transmitting the vibration control instruction to the third-party device, so that the third-party device executes the vibration feedback operation according to the vibration feedback information.

The third-party device is a device other than that configured to perform application control and cloud application content display. The third-party device may be a material network device and is in communication with a terminal device where the cloud application client is located through a network. The cloud application client generates a vibration control instruction for the third-party device according to the vibration feedback information. The vibration control instruction includes parameters generated according to the vibration feedback information for executing vibration, for example, values such as the start moment and end moment of vibration, the display mode and the intensity. The cloud application client transmits the vibration control instruction to the third-party device, so that the third-party device executes the vibration feedback operation according to the vibration feedback information.

Taking a cloud game as an example, assuming that a user plays adventure games with a mobile phone and controls a character into a bumpy environment, the vibration feedback information transmitted by the game client to the cloud game client may include information about seat sway control, and the cloud game client generates a vibration control instruction for seat sway control based on the vibration feedback information, and transmits to a smart seat in the room, the smart seat is lowered and shaken according to the received vibration control instructions, thereby bringing the user a more immersive feeling.

In the embodiments of this application, the cloud game client also controls the third-party device to collaborate on vibration feedback, thereby enriching the vibration display process and improving the display effect of vibration.

Although steps in the method of this application are described in a specific order in the accompanying drawings, this does not request or imply that the steps are executed according to the specific order, or all shown steps are necessarily executed so as to implement a desired result. Additionally or alternatively, some steps may be omitted, a plurality of steps may be combined into one step for execution, and/or one step may be decomposed into a plurality of steps for execution, and the like.

The apparatus embodiments of this application are introduced as follows and may be used for executing the cloud application-based device control method in the foregoing embodiments of this application. FIG. 8A exemplarily illustrates a block diagram of a cloud application-based device control system according to an embodiment of this application, for executing processing related to an application client on a server in the foregoing embodiments. As shown in FIG. 8A, a device control apparatus 800 includes:

a communication establishment module 801, configured to establish a communication connection with a cloud application client on a terminal device, the cloud application client being configured to present a received cloud application video stream;

a scene recognition module 802, configured to perform scene recognition on a cloud application corresponding to the cloud application client to obtain a scene recognition result, the scene recognition result including a multimedia content associated with a recognized cloud application scene;

a vibration feedback information generation module 803, configured to generate, according to the scene recognition result, vibration feedback information corresponding to the cloud application scene; and a vibration feedback information transmitting module 804, configured to transmit a video stream corresponding to the cloud application scene and the vibration feedback information to the cloud application client, so that the cloud application client controls a physical device associated with the cloud application client to execute a vibration feedback operation according to the vibration feedback information when presenting the video stream of the cloud application scene.

In some embodiments of this application, based on the technical solutions above, the first communication establishment module 801 includes:

a communication establishment request transmitting unit, configured to transmit a communication establishment request to the cloud application client; and a communication response message receiving unit, configured to receive a communication response message returned by the cloud application client, and establish the communication connection with the cloud application client according to the communication response message.

The communication response message includes a vibration feedback type supported by the physical device and a protocol version of the vibration feedback.

The scene recognition module 802 is configured to generate the vibration feedback information according to the scene recognition result, the vibration feedback type, and the protocol version of the vibration feedback.

In some embodiments of this application, based on the technical solutions above, the scene recognition module 802 includes:

a character attribute value acquisition unit, configured to acquire a character attribute value of a target virtual character in the cloud application at a current moment; and a scene recognition unit, configured to recognize the cloud application scene according to the character attribute value to obtain the scene recognition result.

In some embodiments of this application, based on the technical solutions above, the scene recognition module 802 includes:

a scene identifier acquisition unit, configured to acquire, according to a mapping relationship between a preset time period and a scene identifier, a scene identifier of a target virtual character at a current moment, the scene identifier being configured to represent a surrounding environment where the target virtual character is located; and a scene recognition result determination unit, configured to determine the scene recognition result according to a mapping relationship between a preset scene identifier and a scene type, and the scene identifier at the current moment.

In some embodiments of this application, based on the technical solutions above, the character attribute value acquisition unit includes:

a character control instruction receiving subunit, configured to receive a character control instruction transmitted by the cloud application client for the target virtual character; and a virtual character control subunit, configured to control the target virtual character according to the character control instruction to obtain a character attribute value of the target virtual character at the current moment.

The scene recognition unit includes:

an attribute value change amplitude determination subunit, configured to determine an attribute value change amplitude according to a character attribute value of the target virtual character at a previous moment and a character attribute value at the current moment; and a recognition result determination subunit, configured to determine the scene recognition result according to the attribute value change amplitude.

In some embodiments of this application, based on the technical solutions above, the vibration feedback information includes a vibration feedback type, and the cloud application client controls the physical device to execute a vibration feedback operation indicated by the vibration feedback type.

In some embodiments of this application, based on the technical solutions above, the vibration feedback information includes a time parameter of vibration feedback, the time parameter is used for indicating a time period for performing the vibration feedback, and the cloud application client controls the physical device to execute the vibration feedback operation within a time period indicated by the time parameter.

In some embodiments of this application, based on the technical solutions above, the vibration feedback information includes an execution frequency of the vibration feedback, and the cloud application client controls the physical device to execute the vibration feedback operation according to the execution frequency of the vibration feedback.

In some embodiments of this application, based on the technical solutions above, the vibration feedback information includes an execution intensity of the vibration feedback, and the cloud application client controls the physical device to execute the vibration feedback operation according to the execution intensity of the vibration feedback.

In some embodiments of this application, based on the technical solutions above, the vibration feedback information transmitting module 804 includes:

a server communication unit, configured to transmit a video stream corresponding to the cloud application scene and the vibration feedback information to a cloud application server, so that the cloud application server packages the vibration feedback information according to a vibration protocol and transmits a packaging result and the video stream to the cloud application client.

Figure 8B:
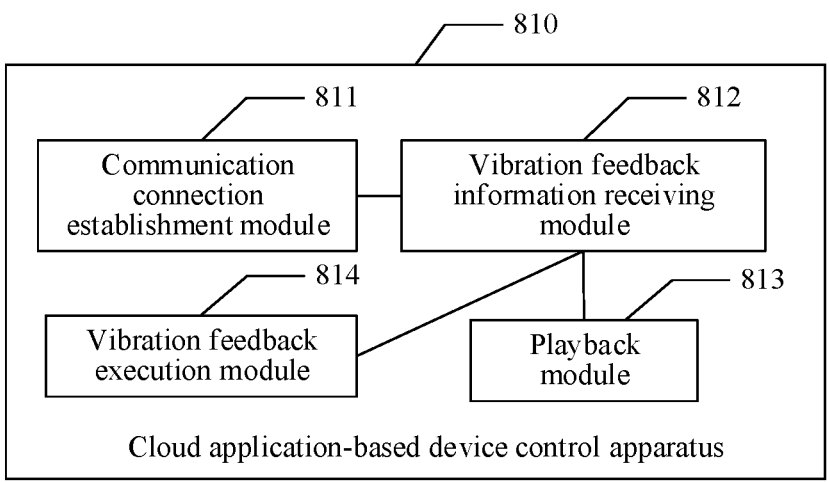
FIG. 8B exemplarily illustrates a block diagram of a cloud application-based device control apparatus according to another embodiment of this application.

According to another aspect of the embodiments of this application, provided is a cloud application-based device control apparatus. FIG. 8B exemplarily illustrates a block diagram of a cloud application-based device control apparatus according to another embodiment of this application, for executing processing related to the cloud application client in the foregoing embodiments. As shown in FIG. 8B, a device control apparatus 810 includes:

a communication connection establishment module 811, configured to establish a communication connection with a cloud application server;

a vibration feedback information receiving module 812, configured to receive a video stream corresponding to a cloud application scene transmitted by a cloud application server and vibration feedback information, the vibration feedback information being generated by an application client on the server according to the cloud application scene;

a playback module 813, configured to play back the video stream corresponding to the cloud application scene; and a vibration feedback execution module 814, configured to control, according to the vibration feedback information, a physical device associated with a cloud application client to execute a vibration feedback operation.

In some embodiments of this application, based on the technical solutions above, the communication connection establishment module 811 includes:

a communication establishment request receiving unit, configured to receive a communication establishment request transmitted by the cloud application server;

a vibration feedback query unit, configured to query a vibration feedback type supported by the physical device and a protocol version of vibration feedback according to the communication establishment request; and a communication response message transmitting unit, configured to transmit a communication response message to the cloud application server, the communication response message including the vibration feedback type and the protocol version of the vibration feedback, so that the application client generates the vibration feedback information according to the vibration feedback type and the protocol version of the vibration feedback.

In some embodiments of this application, based on the technical solutions above, the physical device associated with the cloud application client also includes a third-party device. The vibration feedback execution module also includes:

a vibration control instruction generation module, configured to generate a vibration control instruction for the third-party device according to the vibration feedback information; and a vibration control instruction transmitting module, configured to transmit the vibration control instruction to the third-party device, so that the third-party device executes the vibration feedback operation according to the vibration feedback information.

The apparatus and method provided in the foregoing embodiments belong to the same concept, and specific operation manners of each module are described in detail in the method embodiments, and are not repeated here.

Figure 9:
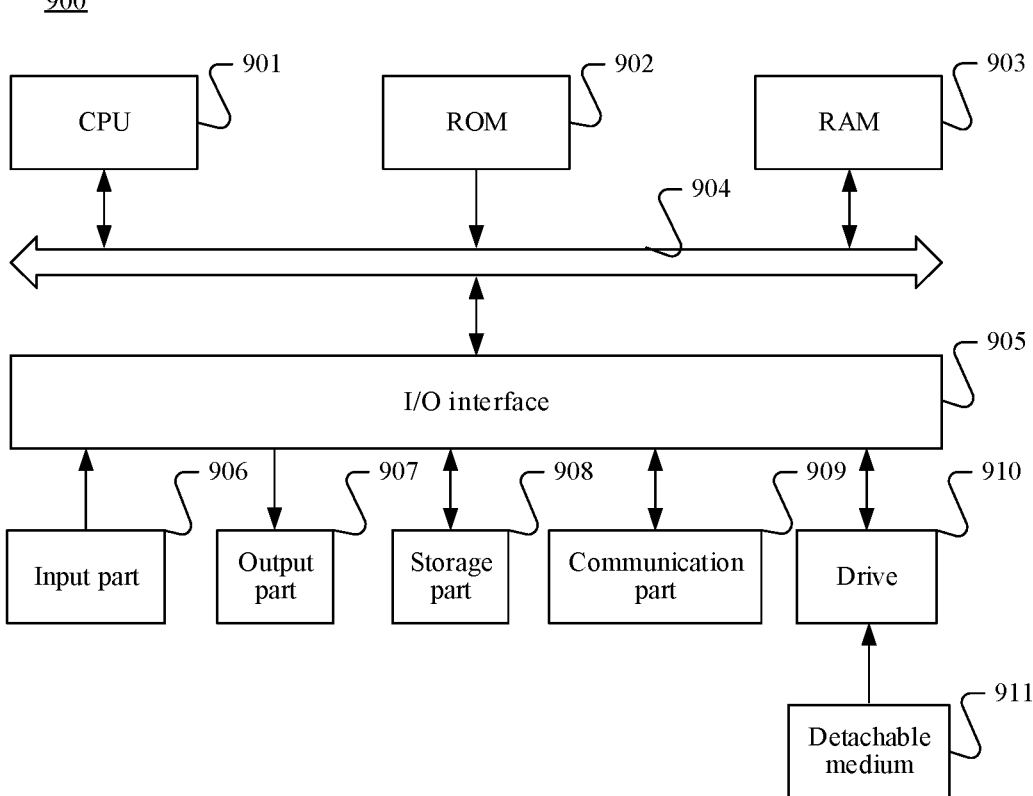
FIG. 9 illustrates a schematic structural diagram of an electronic device adapted to implement an embodiment of this application.

FIG. 9 illustrates a schematic structural diagram of an electronic device adapted to implement an embodiment of this application.

An electronic device 900 as shown in FIG. 9 is only an example, and may not bring any limitation to the function and use ranges of the embodiment of this application.

As shown in FIG. 9, the electronic device 900 includes a Central Processing Unit (CPU) 901, which may execute various proper actions and processing based on a program stored in a Read-Only Memory (ROM) 902 or a program loaded from a storage part 908 into a Random Access Memory (RAM) 903. Various programs and data required for system operations are also stored in the RAM 903. The CPU 901, the ROM 902, and the RAM 903 are connected to each other through a bus 904. An Input/Output (I/O) interface 905 is also connected to the bus 904.

The following components are connected to the I/O interface 905: an input part 906 including a keyboard and a mouth, etc.; an output part 907 including, such as a Cathode Ray Tube (CRT), a Liquid Crystal Display (LCD), and a loudspeaker; a storage part 908 including a hard disk, etc.; and a communication part 909 including, for example, a Local Area Network (LAN) card, a modem, and other network interface cards. The communication part 909 performs communication processing via a network such as the Internet. A drive 910 is also connected to the I/O interface 905 as required. A removable medium 911, such as a magnetic disk, an optical disc, a magneto-optical disk, or a semiconductor memory, is installed on the drive 910 as required, so that a computer program read from the removable medium is installed into the storage part 908 as required.

Particularly, according to the embodiments of this application, the process described in each method flowchart may be implemented as a computer software program. For example, the embodiment of this application includes a computer program product, including a computer program carried on a computer-readable medium, the computer program including a program code used for performing the method as shown in the flowchart. In such an embodiment, the computer program may be downloaded and installed from the network through the communication part 909 and/or may be installed from the removable medium 911. When the computer program is executed by the CPU 901, the various functions defined in the system of this application are executed.

The computer-readable medium shown in the embodiment of this application may be a computer-readable signal medium, or a computer-readable storage medium, or any combination thereof. The computer-readable storage medium may be, for example, but is not limited to, an electric, magnetic, optical, electromagnetic, infrared, or semi-conductive system, apparatus, or component, or any combination of the above. A more specific example of the computer-readable storage medium may include, but is not limited to: an electrical connection having one or more wires, a portable computer magnetic disk, a hard disk, a RAM, a ROM, an erasable programmable read-only memory (EPROM), a flash memory, an optical fiber, a compact disk read-only memory (CD-ROM), an optical storage device, a magnetic storage device, or any suitable combination thereof. In this application, the computer-readable storage medium may be any tangible medium containing or storing a program, and the program may be used by or used in combination with an instruction execution system, an apparatus, or a device. In this application, the computer-readable signal medium may include a data signal propagated in a baseband or as a part of a carrier wave, where a computer-readable program code is carried. A data signal propagated in such a way may assume a plurality of forms, including, but not limited to, an electromagnetic signal, an optical signal, or any appropriate combination thereof. The computer-readable signal medium may also be any computer-readable medium except the computer-readable storage medium. The computer-readable medium may transmit, propagate, or transmit a program intended for use by, or in combination with, an instruction execution system, an apparatus, or a device. The program codes included on the computer-readable medium may be transmitted by using any proper medium, including, but not limited to: wireless, wired, and the like, or any proper combination thereof.

The flowcharts and block diagrams in the accompanying drawings illustrate possible system architectures, functions and operations that may be implemented by a system, a method, and a computer program product according to various embodiments of this application. In this regard, each box in a flowchart or a block diagram may represent a module, a program segment, or a part of code. The module, the program segment, or the part of code includes one or more executable instructions used for implementing designated logic functions. In some alternative implementations, the functions annotated in boxes may also occur in a different order from those annotated in the accompanying drawings. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

Although a plurality of modules or units of a device configured to perform actions are discussed in the foregoing detailed description, such division is not mandatory. Actually, according to the implementations of this application, the features and functions of two or more modules or units described above may be specifically implemented in one module or unit. On the contrary, the features and functions of one module or unit described above may be further divided to be embodied by a plurality of modules or units.

According to the foregoing descriptions of the implementations, a person skilled in the art may readily understand that the exemplary implementations described herein may be implemented by using software, or may be implemented by combining software with necessary hardware. Therefore, the technical solutions of the embodiments of this application may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of this application.

After considering the specification and practicing the invention disclosed herein, a person skilled in the art may easily conceive of other implementations of this application. This application is intended to cover any variation, usage, or adaptive change of this application, these variations, usages, or adaptive changes follow the general principles of this application and include common knowledge or common technical means in the related art which are not disclosed in this application.

In this application, the term "module" or "unit" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module or unit can be implemented using one or more processors (or processors and memory). Likewise, a processor (or processors and memory) can be used to implement one or more modules. Moreover, each module or unit can be part of an overall module that includes the functionalities of the module or unit. It is to be understood that this application is not limited to the precise structures described above and shown in the accompanying drawings, and various modifications and changes may be made without departing from the scope of this application. The scope of this application shall only be limited by the appended claims.

What is claimed is:

1. A cloud application-based device control method performed by an electronic device, the method comprising:

establishing a communication connection with a cloud application server;

receiving, via the communication connection, a communication establishment request transmitted by the cloud application server;

querying a multimedia feedback type supported by a physical device associated with the electronic device and a protocol version of multimedia feedback according to the communication establishment request;

transmitting, via the communication connection, a communication response message to the cloud application server, the communication response message comprising the multimedia feedback type and the protocol version of the multimedia feedback;

receiving, via the communication connection, a video stream corresponding to a cloud application scene transmitted by the cloud application server and multimedia feedback information corresponding to the cloud application scene, wherein the cloud application server is configured to (i) perform scene recognition on the cloud application scene to obtain a scene recognition result and (ii) determine the multimedia feedback information based on the scene recognition result, the multimedia feedback type and the protocol version of the multimedia feedback; and controlling the physical device associated with a cloud application client on the electronic device to execute a multimedia feedback operation in accordance with the multimedia feedback information while the video stream corresponding to the cloud application scene being played by the cloud application client on the electronic device.

2. The method according to claim 1, wherein the physical device comprises a third-party device, and the controlling a physical device associated with the cloud application client to execute a multimedia feedback operation in accordance with the multimedia feedback information comprises:

generating a multimedia control instruction for the third-party device according to the multimedia feedback information; and transmitting the multimedia control instruction to the third-party device, so that the third-party device executes the multimedia feedback operation according to the multimedia feedback information.

3. The method according to claim 1, wherein the multimedia feedback information comprises a multimedia feedback type, and the cloud application client controls the physical device to execute the multimedia feedback operation indicated by the multimedia feedback type.

4. The method according to claim 1, wherein the multimedia feedback information comprises a time parameter of multimedia feedback, the time parameter is used for indicating a time period for performing the multimedia feedback, and the cloud application client controls the physical device to execute the multimedia feedback operation within a time period indicated by the time parameter.

5. The method according to claim 1, wherein the multimedia feedback information comprises an execution frequency of the multimedia feedback, and the cloud application client controls the physical device to execute the multimedia feedback operation according to the execution frequency of the multimedia feedback.

6. The method according to claim 1, wherein the multimedia feedback information comprises an execution intensity of the multimedia feedback, and the cloud application client controls the physical device to execute the multimedia feedback operation according to the execution intensity of the multimedia feedback.

7. An electronic device, comprising:

a processor; and a memory, configured to store an executable instruction of the processor;

the processor being configured to execute the executable instruction to implement a cloud application-based device control method including:

establishing a communication connection with a cloud application server;

receiving, via the communication connection, a communication establishment request transmitted by the cloud application server;

querying a multimedia feedback type supported by a physical device associated with the electronic device and a protocol version of multimedia feedback according to the communication establishment request;

transmitting, via the communication connection, a communication response message to the cloud application server, the communication response message comprising the multimedia feedback type and the protocol version of the multimedia feedback;

receiving, via the communication connection, a video stream corresponding to a cloud application scene transmitted by the cloud application server and multimedia feedback information corresponding to the cloud application scene, wherein the cloud application server is configured to (i) perform scene recognition on the cloud application scene to obtain a scene recognition result and (i) determine the multimedia feedback information based on the scene recognition result, the multimedia feedback type and the protocol version of the multimedia feedback; and controlling the physical device associated with a cloud application client on the electronic device to execute a multimedia feedback operation in accordance with the multimedia feedback information while the video stream corresponding to the cloud application scene being played by the cloud application client on the electronic device.

8. The electronic device according to claim 7, wherein the physical device comprises a third-party device, and the controlling a physical device associated with the cloud application client to execute a multimedia feedback operation in accordance with the multimedia feedback information comprises:

generating a multimedia control instruction for the third-party device according to the multimedia feedback information; and transmitting the multimedia control instruction to the third-party device, so that the third-party device executes the multimedia feedback operation according to the multimedia feedback information.

9. The electronic device according to claim 7, wherein the multimedia feedback information comprises a multimedia feedback type, and the cloud application client controls the physical device to execute the multimedia feedback operation indicated by the multimedia feedback type.

10. The electronic device according to claim 7, wherein the multimedia feedback information comprises a time parameter of multimedia feedback, the time parameter is used for indicating a time period for performing the multimedia feedback, and the cloud application client controls the physical device to execute the multimedia feedback operation within a time period indicated by the time parameter.

11. The electronic device according to claim 7, wherein the multimedia feedback information comprises an execution frequency of the multimedia feedback, and the cloud application client controls the physical device to execute the multimedia feedback operation according to the execution frequency of the multimedia feedback.

12. The electronic device according to claim 7, wherein the multimedia feedback information comprises an execution intensity of the multimedia feedback, and the cloud application client controls the physical device to execute the multimedia feedback operation according to the execution intensity of the multimedia feedback.

13. A non-transitory computer-readable medium, having a computer program stored thereon, the computer program, when executed by a processor of an electronic device, causing the electronic device to implement a cloud application-based device control method including:

establishing a communication connection with a cloud application server;

receiving, via the communication connection, a communication establishment request transmitted by the cloud application server;

querying a multimedia feedback type supported by a physical device associated with the electronic device and a protocol version of multimedia feedback according to the communication establishment request;

transmitting, via the communication connection, a communication response message to the cloud application server, the communication response message comprising the multimedia feedback type and the protocol version of the multimedia feedback;

receiving, via the communication connection, a video stream corresponding to a cloud application scene transmitted by the cloud application server and multimedia feedback information corresponding to the cloud application scene, wherein the cloud application server is configured to (i) perform scene recognition on the cloud application scene to obtain a scene recognition result and (i) determine the multimedia feedback information based on the scene recognition result, the multimedia feedback type and the protocol version of the multimedia feedback; and controlling the physical device associated with a cloud application client on the electronic device to execute a multimedia feedback operation in accordance with the multimedia feedback information while the video stream corresponding to the cloud application scene being played by the cloud application client on the electronic device.

14. The non-transitory computer-readable medium according to claim 13, wherein the physical device comprises a third-party device, and the controlling a physical device associated with the cloud application client to execute a multimedia feedback operation in accordance with the multimedia feedback information comprises:

generating a multimedia control instruction for the third-party device according to the multimedia feedback information; and transmitting the multimedia control instruction to the third-party device, so that the third-party device executes the multimedia feedback operation according to the multimedia feedback information.

* * * * *